United States Patent

Wohnlich

[15] 3,642,245
[45] Feb. 15, 1972

[54] BREAKAWAY BRACKET

[72] Inventor: Joseph F. Wohnlich, Warren, Ind.

[73] Assignee: United Filtration Corporation, Chicago, Ill.

[22] Filed: Mar. 19, 1970

[21] Appl. No.: 20,942

[52] U.S. Cl............................248/478, 248/289, 248/475 B
[51] Int. Cl..............................................................B60r 1/06
[58] Field of Search.................248/145, 282, 285, 289, 290, 248/475 A, 475 B, 475 R, 477, 478

[56] References Cited

UNITED STATES PATENTS 3,119,591  1/1964  Malecki..................................248/282
3,384,334  5/1968  Malachowski......................248/289 X
3,107,077  10/1963  Lassa......................................248/478

*Primary Examiner*—William H. Schultz
*Attorney*—Parker, Carter & Markey

[57] ABSTRACT

This is a hinge or joint for releasably holding a rear vision mirror for use on the cab of a truck or the like in position but constructed to yield or "give" in response to a predetermined breakaway force so that the mirror will fold in to avoid breakage or bending of the supporting parts.

4 Claims, 3 Drawing Figures

PATENTED FEB 15 1972

3,642,245

INVENTOR.
Joseph F. Wohnlich
BY Parker, Carter & Markey
Attorneys.

BREAKAWAY BRACKET

SUMMARY OF THE INVENTION

This invention is in the field of hinges for supporting rear vision mirrors in an extended position on the side of trucks and the like and is concerned with a hinge or joint with a radial clutch or detent constructed to hold the mirror in an adjusted position but to release it in response to a certain breakaway force to prevent the mirror and/or its supports from being broken, bent and/or damaged.

A primary object of the invention is a hinge or joint which can be adjusted to hold the mirror in any selected position.

Another object is a hinge which is permanently and securely joined to one of the supports, either the bracket or brackets extending to the cab or to the mirror support.

Another object is a hinge which detents in a radial direction.

Another object is a hinge of the above type with three positions, first a relatively fixed position requiring a certain breakaway force; second, a movable position with a certain drag less than the breakaway force; and, third, a free position where a mirror is more or less free to pivot on the hinge.

Another object is a hinge with a greatly increased useful life.

Another object is a hinge of the above type with a movable position that provides a certain amount of drag.

Another object is a hinge of the above type which will not be subject to banging-type damage.

Another object is a hinge of the above type with a greater breakaway force.

Another object is a hinge which will not be subject to weathering and premature failure.

Another object is a hinge with a more rigid joint without the expense of costly machining.

Other objects will appear from time to time in the ensuing specification and drawings:

DESCRIPTION OF THE PREFERRED EMBODIMENT

Figure 1:
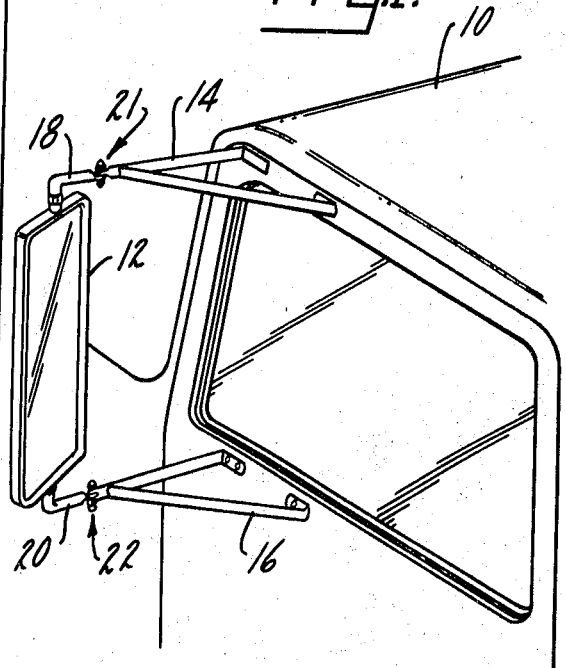
FIG. 1 is a perspective of a mirror mounted on the side of a truck cab.

In FIG. 1 the truck or cab has been indicated generally at 10 with a mirror at 12 of the rear vision type mounted on suitable supports or brackets 14 on top and 16 at the bottom, all of which may be conventional. The mirror itself may be mounted on arms 18 and 20 which on their inner ends are connected to the mounting brackets by hinges 21 and 22.

Figure 2:
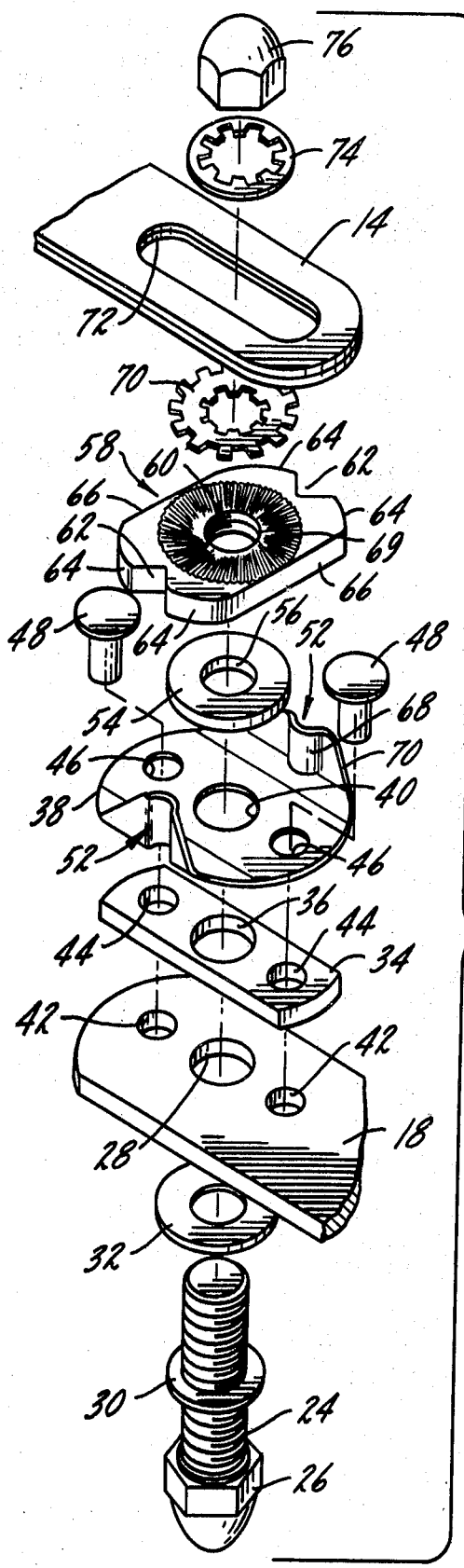
FIG. 2 is an exploded view of the hinge on an enlarged scale.
Figure 3:
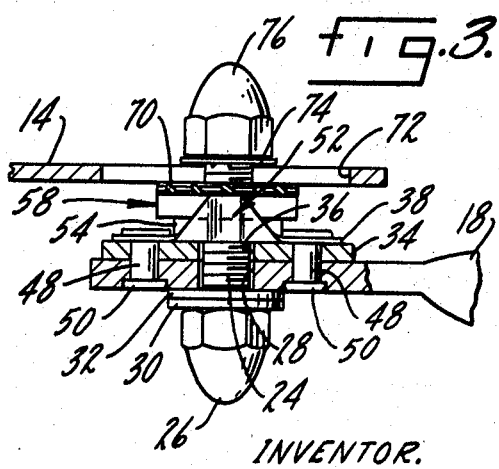
FIG. 3 is a side view of the hinge, assembled and partly in section.

One hinge is shown and will be explained in detail in connection with FIGS. 2 and 3 and it will be understood that they may be the same. The hinge includes a center bolt 24, threaded on its exterior, and shown in the form of a crown bolt with a head 26, in this case on the bottom, but it might be on top. Hereinafter the designation "bottom" and "top" shall be used in connection with the explanation of the structures shown in FIGS. 2 and 3 and it will be understood that the hinge will work vertical, horizontal, or upside down or otherwise from what is shown in FIGS. 2 and 3. In short, orientation is not important and any such designations used hereinafter are merely for purposes of explanation.

The mirror arm, assumed to be the upper arm, is indicated at 18 with a center hole adjacent the end thereof, as at 28, to accept the main bolt. The hole 28 is not threaded and is oversize so that the threaded shank of the bolt will slide through easily. The crown bolt carries a conventional washer 30 and a primary washer 32 below the mirror arm, the primary washer 32 being made out of nylon or its equivalent.

A spacing plate 34 is positioned above the mirror arm and has a central opening 36 to receive the threaded shank of the crown bolt. Opening 36 is not threaded and is slightly oversize so that the threaded shank will move through easily. Next is a spring plate 38 made of relatively thin gauge metal or the like with a central opening 40 to receive the threaded shank of the crown bolt, the opening 40, like the openings 28 and 36, being slightly oversize so that the threaded shank will move through freely.

The mirror arm 18, the spacer plate 34, and the spring plate 38 have pairs of matching rivet holes, 180° apart on opposite sides of the center hole. In the mirror arm the paired holes are designated 42, in the spacer plate 44, and in the spring plate 46. When these three parts are assembled, rivets 48 are passed through these holes in either direction. In the form shown, the heads of the rivets are on top with the shanks coming down through, first, the spring plate 38, then the spacing plate 34, then the mirror arm 18, after which they are upset or headed below the mirror arm, as at 50 in FIG. 3. The spacing and dimensioning is such that the mirror arm, spacer plate and spring plate are all rigidly held together in a tight, nonyielding joint by the rivets along a plane between the rivets which, in the form shown, is generally parallel to the extension of the mirror arm 18. It will be noted that the lateral dimension of the spacer plate 36 is somewhat restricted so that the two areas or parts of the spring plate opposite the rivet holes 46 will overlap or extend out beyond the spacer plate by a substantial amount. Those areas, roughly 90° from the plane of the rivet holes 46, are both upstruck or bent as at 52 in the form of what will be referred to as an ear, the precise form, shape and function of which will be explained hereinafter.

A washer 54 of nylon or the like with a center hole 56, slightly oversize so that it will freely accept the threaded shank of the crown bolt, is positioned on top of the spring plate providing suitable axial spacing for and supporting a so-called cam 58 in the form of a somewhat thicker and, therefore, more rigid plate. The center of the cam is provided with a threaded hole 60 to mesh with the threads on the shank 24 of the crown bolt. The periphery of the cam is provided with two generally V-shaped notches 62 shown as disposed 180° apart opposite each other across center hole 60. The notches are each bounded by an arcuate portion 64 on each side thereof for a short distance followed by flats 66 which may be considered the chord of the arc therebetween, generally parallel to each other and, as shown, generally parallel to the lateral plane of the notches 62. All four arcs 64 may be considered to be swung on a constant radius about the center axis of hole 60 and therefore, the axis of the crown bolt.

Returning to the upstruck ears 52 on the spring plate 38, it will be noted that each is somewhat triangular when viewed from the side, as in FIG. 3, with a center axially elongated indent 68 flanked by wings 70 on each side thereof, all integrally joined to the main flat body of the spring plate. The inward radial extent of the indents 68 is related to the depth of the notches 62 so that a desired breakaway force, referred to hereinafter, may be obtained. The sides of the notches 62 have been shown at approximately 90° to each other, but this may vary. The height or axial extent of the washer 54 is such that the periphery of the cam will be well spaced above the upper flat surface of the main body of the spring plate. Note the spacing in FIG. 3. At the same time, the indents 68 confront the side or periphery of the cam throughout the axial extent thereof and the amount of drag or friction, one against the other, can be set by proper choice of the cam thickness and flexibility of the ears.

The upper surface of the cam is shown with a serrated ring or annulus 69 which matches a conventional internal-external lock washer 70 mounted around the crown bolt above the cam plate. One arm of the upper mounting bracket is indicated at 14 with an elongated slot 72 followed by a conventional internal lock washer 74 above it around the crown bolt. On top is a crown nut 76 or the like which, as shown in FIG. 3, is threaded to the end of the crown bolt to squeeze and hold the whole thing together, enough axial compression being applied so that the lock washers 70 and 74 bite into both sides of the bracket arm 14 and into the serrated annulus 69 on the upper surface of the cam to hold those parts in place and prevent slipping.

The use, operation and function of the invention are as follows:

It is desirable to hold a rear vision mirror in an extended fixed position but to have it releasable if it hits an obstacle, such as a wall, a truck body, or what have you. After it has been folded in or out as the case may be, it is desirable to be able to simply and easily bring it back to precisely and exactly the same position it was in before it hit the wall, truck, or whatever. If it has to be readjusted, this can require that one man sit in the cab and another adjust the mirror on the outside since the mirror is too far away for the man in the cab to reach it.

The hinge shown and described has the advantage that when a certain breakaway force is applied to the mirror, the ears 52 will flex out of the cam notches 62. Then they will drag along the arc 64 with the ears being flexed out or spread slightly but resisting such movement with a certain drag. Thereafter when the ears are opposite the flats 66, they will be out of contact with the side of the cam plate and the mirror will freely pivot. Thus the device has three positions, first, when the ears 52 are in the notches 62, second, when the ears are flexed outwardly somewhat and in contact with the arcs 64, and, third, when the ears are opposite the flats 66 and completely out of contact with free swinging movement.

The crown bolt 24 and nut 76 apply sufficient axial compression so that the lock washers 70 and 74 grab and hold the supporting arm or bracket 14 and cam 58 relative to each other to prevent rotation of the cam. But they can be loosened and the cam adjusted. The rivets rigidly tie the spring plate 38 to mirror support arm 18 but allow the opposite portions of the spring plate to flex as the ears 52 move on the cam periphery. The dimensioning of the notches 62 in the cam periphery and the indents 68 in the spring plate ears is such that both sides of the notch will be engaged by the indents without any play.

The three positions of the detent have the advantage that the mirror will be held firmly but releasably in a preselected position but can be moved therefrom. The arcs, when in engagement with the winged detents, have the advantage that the force applied to slide therealong is substantially less than the breakaway force necessary to disengage the detents from the notches 62 but is appreciable and will hold the mirror in position for the operator to move it back and engage the detents. The complete clearance of the flats 66 enables the mirror to freely swing, but only after the arcs have been cleared.

The unit also has a greatly increased useful life since even in its unlocked position, it will have a certain amount of drag and will not flop around. It can be unlocked but will still be relatively secure. This prevents banging-type damage.

The unit does not have any gaskets or rubberlike washers or friction plates which can deteriorate rapidly in the open. In short, the hinge is entirely of metal and will not fail prematurely.

Rigidly joining the arm and hinge plates without any costly machining makes an economical but much sturdier unit.

While the preferred form and several variations of the invention have been shown and suggested, it should be understood that suitable additional modifications, changes, substitutions and alterations may be made without departing from the invention's fundamental theme.

I claim:

1. In a hinge for releasably and rotatably connecting and supporting a rear vision mirror to a supporting bracket on the side of a truck cab or the like, a main bolt adapted to be disposed generally upright and extending through the supporting bracket at one end and through the mounting of the rear vision mirror at the other, a cam on the bolt intermediate the ends thereof, a spring plate on the bolt opposing the cam, a releasable detent joint between the cam and spring plate constructed to hold the mirror on its mounting in a fixed position, but to release it for pivoting movement about the bolt in response to a predetermined breakaway pressure, and a fixed permanent connection between the spring plate and one of the supports constructed to prevent relative rotation therebetween at all times, the cam including at least two equidistantly spaced peripheral notches adapted to engage and interfittingly receive axially extending, peripherally spaced, flexible ears on the periphery of the spring plate.

2. The structure of claim 1 further characterized in that the portion of the spring plate adjacent the flexible ears is unsupported and is in the form of an overhang so that the plate itself may freely flex allowing the ears to cam in and out of the peripheral notches on the cam.

3. The structure of claim 1 further characterized by and including equidistantly spaced reliefs on the periphery of the cam dimensioned to clear the ears on the spring plate when aligned with them to provide limited free rotation of the mirror and its support when the ears on the spring plate are radially aligned with the reliefs.

4. The structure of claim 1 further characterized in that the fixed permanent connection between the spring plate and one of the supports includes two rivets, 180° apart, passing through the spring plate and support and headed on both sides thereof.

* * * * *